United States Patent [19]

Kane et al.

[11] Patent Number: 5,423,221
[45] Date of Patent: Jun. 13, 1995

[54] MASS FLOW MEASURING DEVICE

[75] Inventors: Martin Kane, Atlantic City, N.J.;
Andras Kiss, Kitaibel, Hungary;
Sandor Kun, Budapest, Hungary;
Zoltan Biro, Budapest, Hungary;
Zaltan Varga, Budapest, Hungary;
Peter Salamon, Budapest, Hungary;
Wayne Pratt, Scottsdale, Ariz.;
Lazslo Szabo; Jozsef Alesz, both of Budapest, Hungary

[73] Assignee: ABB K-Flow Inc., Millville, N.J.

[21] Appl. No.: 912,893

[22] Filed: Sep. 26, 1986

Related U.S. Application Data

[63] Continuation-in-part of Ser. No. 809,659, Feb. 11, 1986, Pat. No. 4,716,771.

[51] Int. Cl.⁶ .................................... G01F 1/84
[52] U.S. Cl. .................................... 73/861.38
[58] Field of Search ........... 73/861.37, 861.38, 32, 73/17

[56] References Cited

U.S. PATENT DOCUMENTS

| | | | |
|---|---|---|---|
| Re. 31,450 | 11/1983 | Smith | 73/861.38 |
| 2,865,201 | 12/1958 | Roth | 73/861.38 |
| 3,080,750 | 3/1963 | Wiley et al. | 73/194 |
| 4,311,054 | 1/1982 | Cox et al. | 73/861.38 |
| 4,420,983 | 12/1983 | Langdon | 73/32 A |
| 4,491,025 | 1/1985 | Smith | 73/861.38 |
| 4,622,858 | 11/1986 | Mizerak | 73/861.38 |
| 4,628,744 | 12/1986 | Lew | 73/861.38 |
| 4,635,485 | 1/1987 | Lew | 73/861.37 |
| 4,653,332 | 3/1987 | Simonsen | 73/861.38 |
| 4,655,089 | 4/1987 | Kappelt et al. | 73/861.38 |
| 4,658,657 | 4/1987 | Kuppers | 73/861.38 |
| 4,660,421 | 4/1987 | Dahlin et al. | 73/861.38 |
| 4,680,974 | 7/1987 | Simonsen et al. | 73/861.38 |
| 4,689,989 | 9/1987 | Aslesen et al. | 73/61.1 R |
| 4,691,578 | 9/1987 | Herzl | 73/861.38 |
| 4,703,660 | 11/1987 | Brenneman | 73/861.38 |
| 4,711,132 | 12/1987 | Dahlin | 73/861.38 |
| 4,716,771 | 1/1988 | Kane | 73/861.38 |
| 4,726,508 | 2/1988 | Carpenter | 228/263.13 |
| 4,729,243 | 3/1988 | Friedland et al. | 73/861.38 |
| 4,730,501 | 3/1988 | Levien | 73/861.38 |
| 4,733,569 | 3/1988 | Kelsey et al. | 73/861.38 |

(List continued on next page.)

FOREIGN PATENT DOCUMENTS 149900 3/1962 U.S.S.R.
146982 12/1964 U.S.S.R.

OTHER PUBLICATIONS

Langdon "Resonator Sensor"—A Review in J. Physics E. Sci Inst. vol. 18 1985 pp. 107-111.

(List continued on next page.)

Primary Examiner—Herbert Goldstein
Attorney, Agent, or Firm—Seidel Gonda Lavorgna & Monaco

[57] ABSTRACT

A conduit having two substantially parallel, flexible and continuous flow tubes fixedly mounted at their ends to a centrally positioned housing The ends of each flow tube positioned proximal to one another and to the center of gravity formed by the shape of the flow tube. Each flow tube substantially forming a "B" shape having a first loop, a connecting portion and a second loop. The first and second loops being symmetrical with respect to the connecting portion and extending laterally from the center of gravity at a greater distance than the displacement of the connecting portion to the center of gravity. The flow tubes being oscillated in opposing modes at the connecting portion so as to produce a measurable Coriolis reaction force by the fluid on the flow tubes. The vibration means being capable of selectively oscillating the flow tube at least one discrete resonant frequency higher than the fundamental resonance of the flow tube so as to create waves along the tube length and form nodal points which are substantially stationary with respect to the vibrating flow tube. The nodes form free floating flexible joints within the continuous flow tube to separate the oscillation of a portion of the flow tube partially from the fixed mounting points which are typically subject to unwanted vibrational noise.

35 Claims, 4 Drawing Sheets

U.S. PATENT DOCUMENTS

| | | | |
|---|---|---|---|
| 4,738,143 | 4/1988 | Cage et al. | 73/861.38 |
| 4,747,312 | 5/1988 | Herzl | 73/861.38 |
| 4,756,197 | 7/1988 | Herzl | 73/861.38 |
| 4,756,198 | 7/1988 | Levien | 73/861.38 |
| 4,760,744 | 8/1988 | Simonsen et al. | 73/861.38 |
| 4,773,257 | 9/1988 | Aslesen et al. | 73/61.1 R |
| 4,823,614 | 4/1989 | Dahlin | 73/861.38 |

OTHER PUBLICATIONS

Wildhack "Review of Some Methods of Flow Measurement" in Science Aug. 1954.

International Application No. PCT/US85/01326, International Publication No. WO86/00699, published Jan. 30, 1986, assigned to Exac Corporation.

Copy of Soviet Inventions Illustrated, Feb. 4, 1981, printed and published by Derwent Publications Ltd., London.

UK Patent Application 2,171,200A published Aug. 20, 1986.

Danfoss Co., "MASSFLO".

Exac Corp., Digital Precision Mass Flow Meter.

Smith Meter Co., "S-MASS", 1985, Brochures A and B.

Micro Motion Model D25 and Remote Electronics Instruction Manual.

Instrument Engineers Handbook (Rev.Ed.), Mass Flow Meters (pp. 87-90), 1982.

Alan M. Young, "Coriolis-Based Mass Flow Meter", Dec., 1985—*Sensors* magazine.

E. Dahlin, A. Young, R. Blake, C. Guggenheim, S. Kaiser and A. Levien, "Mass Flow Meter"—*Measurement and Controls* magazine.

W. Bye, "Mass Flow Measured with Vibration Generators", Feb. 1957—*Fluid Handling* magazine.

MASS FLOW MEASURING DEVICE

This is a continuation-in-part of application Ser. No. 809,659, filed Feb. 11, 1986, now U.S. Pat. No. 4,716,771, the text of which is herein incorporated by reference.

FIELD OF THE INVENTION

The present invention relates to a mass flow meter of the type having a conduit or flow tube which is oscillated in a direction transverse to the flow, thereby producing a Coriolis reaction force by the fluid against the conduit. Sensors measure the resulting motion of the conduit due to the applied oscillation and the Coriolis reaction with the sensor signal being processed to determine the mass flow through the conduit. The invention more particularly relates to a flow meter which substantially increases the ratio of the signal corresponding to the Coriolis reaction force to the noise in the sensor signal caused by external vibrations typically encountered in industrial environments. This improved ratio is substantially achieved by increasing the immunity of the sensor signals to unwanted noise produced in the environment of the flow meter.

The invention also relates to a flexible conduit design having greater sensitivity in determining the Coriolis reaction and, thus, the mass flow, while maintaining structural integrity and permitting use in a wide range of mass flow applications. Additionally, the invention relates to the oscillation of the conduit at a frequency higher than the fundamental vibrational frequency of the flow tube in producing the Coriolis reaction so as to further isolate the flow tube, and the sensor signals corresponding thereto, from the external influence of the flow meter environment.

BACKGROUND OF THE INVENTION

Coriolis type mass flow meters operate on the principle that fluent material flowing through a conduit, when exposed to a deflection transverse to the flow or motion of the material, will react with a measurable force (the Coriolis force) on the conduit walls. The Coriolis reaction is generated by the flow moving in an instanteously changing curvilinear path and acts with a force which is directly proportional to the mass flow rate through the conduit. Because the Coriolis force is dependent only on the mass rate of flow and the oscillation rate and its effect on the tubing is an integration of the force generated along the length of the tubing, the Coriolis reaction measurement is independent of the physical properties of the fluid, such as density and velocity. By segregating the effect of the Coriolis reaction from the overall conduit motion during operation, a determination of the corresponding mass flow rate may be made.

Known Coriolis type mass flow meters are susceptible to unwanted external noise which influences the conduit motion and the sensing of the Coriolis reaction. Additionally, known meters often compromise structural properties to increase sensitivity of the meter to the Coriolis reaction.

One version of commercially available Coriolis type mass flow meter is produced by the Micro-Motion Corporation and is exemplified by the teachings of U.S. Pat. No. 4,422,338, 4,491,025 and Re. 31,450. Each of these patents show a substantially U-shaped conduit structure having a rigidly mounted flow tube which projects from the fixed mounting position so as to be cantilevered from the mount. The bight end of the relatively stiff cantilevered structure is oscillated preferably perpendicular to the plane of the U-shape and the Coriolis reaction is measured on each of the opposing legs of the U-shape.

The U.S. Pat. No. '025 patent, referred to above, as well as U.S. Pat. No. 4,127,028 show a conduit structure having two identically shaped, adjacently positioned, cantilevered U-shaped flow tubes which create a tuning fork effect during oscillation. Each of the U-shaped flow tubes receives an equivalent and parallel flow and is oscillated in an opposite mode. The deflection of the flow tube due to the Coriolis reaction force on the two oppositely oscillating U-shapes, is also in an opposing direction with the Coriolis reaction at all adjacent points being substantially equal in magnitude. Sensors mounted between the adjacent legs of the two U-shaped tubes measure substantially twice the deflection due to the Coriolis reaction at any one position on the tubes due to this opposing relationship.

Another commercially available version of a Coriolis type mass flow meter is produced by the Exac Corporation and includes a conduit having two projecting tubular loops having long attachment arms which are connected to linearly positioned fixed locations. This type conduit design is comparable to that shown in FIG. 5 of U.S. Pat. No. 4,127,028 referred to above. The tubular loops project away from the line formed between mounting positions of the inlet and the outlet and provide an appearance of being cantilevered but are not rigidly mounted at the base of the projection. This structure creates a flexible flow tube structure by incorporating a torsional bending response of the flow tube along with the deflections due to the Coriolis reaction force. This flexibility of the flow tube structure increases the measureability of the Coriolis reaction force on the conduit.

Existing designs often compromise conduit wall thickness or use long inlet and outlet flow tube sections in order to increase measurement resolution of the conduit deflections due to the Coriolis reaction and to increase the overall sensitivity of the meter. Both of these approaches lead to disadvantages in the final flow meter product. In one case, the flow meter will be limited due to structural weaknesses and, in the other, the increase in Coriolis sensitivity will be coupled with an increased susceptibility to noise, as well as detrimental effects due to added weight of the flow tubing.

Cantilevering a flow tube away from a fixed mounting point (Micro-Motion) or projecting a flexible flow tube loop away from its inlet and outlet (Exac) suspends the flow tube (and the mass of the fluid within the tube) away from the conduit mount. The center of gravity of the flow is also projected or suspended away from this mounting position, making the conduit structure unstable with respect to vibrations from the environment of the flow meter which are transmitted to the conduit shape along with the applied oscillation of operation. In some instances the instability of the suspended weight of the conduit will increase the effect of unwanted vibrations on the flow tube as well as contaminate the Coriolis reaction measurement. External noise, which is produced by mechanical movement along the pipe line or in the local environment of the flow meter, often has an overall vibrational effect on the meter at a frequency close to the fundamental vibrational frequency of the conduit. Additionally, inaccuracies in the oscillatory motion of the flow tube due to inconsistencies in the conduit structure, as well as the nature of the applied oscillatory motion itself, further contaminate the Coriolis measurement. Additional vibrations over those applied during operation of the meter and motion of the flow tube which is not a result of the Coriolis reaction to the applied vibrations manifest themselves as unwanted noise in the signals produced by the flow meter sensors. These unwanted vibrations as well as the suspension of the center of gravity greatly affect the mass flow determination and the accuracy of the meter.

An additional problem found in known Coriolis mass flow meters relates to increase in sensitivity by providing long flow tube extension sections adjacent the inlet and outlet to the flow meter to increase flexibility of the flow tube and to increase the measurability of the Coriolis reaction force. These extensions can be seen in both U.S. Pat. No. 4,127,028 and U.S. Pat. No. 4,559,833, showing S-shaped flow tubes. Extension sections add to the overall weight of the meter and suspend the weight of the flow tube from its mounting. Also, restrictions may be introduced within the conduit flow path via these extensions which may further limit the usefulness of the meter in certain applications as well as limit the overall accuracy of the meter. In turn the natural frequency of the applied oscillation is typically lowered to achieve a more easily determined displacement of the conduit due to the Coriolis reactions.

Internal flow restrictions are also found in the commercially available flow meter produced by the Smith Meter Company, the assignee of U.S. Pat. No. 4,559,833, which includes an "S" shaped conduit positioned transverse to the line of the inlet and outlet. This conduit structure includes an elbow portion which directs the flow into and out of the "S" shape, which is positioned transverse to the inlet and outlet, and includes relatively tight turns within the "S" tube portion. The flow restrictions created by this structure may be detrimental to the flow, moving through the conduit such that certain fluids may not be applicable for measurement by Coriolis type meters. Additionally, the weight of the horizontally positioned "S" shaped conduit is suspended between its supports such that a component of the weight of the fluid and the tubing resists the applied oscillatory motion of the meter as well as the Coriolis reaction. The suspended weight of the flow tube also creates an unstable structure which is subject to external noise influences. Commonly assigned and co-pending application Ser. No. 809,658 filed Dec. 16, 1985, now U.S. Pat. No. 4,716,771 issued Jan. 5, 1988, which is herein incorporated by reference, teaches a flexible conduit of relatively long length which is spiralled about the axis defined by its inlet and outlet. The loop of the continuous tubing is, ideally, positioned substantially transverse to the flow of the defined fluid stream. The intent of this flexible design is to remove the effect of transverse oscillations from the conduit environment while providing an extremely flexible structure which will enhance Coriolis reaction sensitivity.

A typical problem in evaluating the function and resultant motion of the flow meter geometry relates to the nomenclature utilized to describe the operation and function of the conduit in response to both the oscillation of the conduit transverse to the flow as well as the deflections due to the Coriolis reaction of the fluid on the conduit. The language utilized to describe the function of the flow meter is typically related to a fluid particle which moves through the flow tube and is then continued when describing the motion of the rigid body of the flow tube. In describing the U-shaped conduits, as found in the reissue patent, the U.S. Pat. No. '028 patent, the U.S. Pat. No. '025 patent and the U.S. Pat. No. '338 patent (referred to above), references are also made to "a fixed axis" about which the U-shaped conduit is "rotated". The original Coriolis mass flow meters of the 1950's (as illustrated by Pearson U.S. Pat. No. 2,624,198, Roth U.S. Pat. No. 2,865,201, etc.) utilize rotating conduits or rigid circular shaped flow tubes which are vibrated to produce the Coriolis reaction force in response to the rotation of the flow through the flow tube. There is a tendency, because of the developmental history of Coriolis mass flow meters, to describe vibrating or oscillating type Coriolis flow meter conduits as also rotating about a deflection and/or oscillation axis. However, the bight end of a cantilevered beam does not "rotate" about its fixed mounting point but, rather, deflects at all points along the conduit length in a non-circular and non-uniform manner about this mounting position. Additionally, since the flow meter conduit is, typically, positioned within a pipeline or a defined fluid stream, which is not rigidly fixed, the fixed mounting points will also move in response to both the applied oscillation of the flow meter as well as in response to external vibrations and noise created in its environment. This essentially non-rotational relationship is also found in a projecting loop type conduit structure since the extension portions of the loop will flex in a non-uniform or non-circular manner and since the projection is not rigidly mounted to a fixed structure.

The oscillation of the bight end of a cantilevered U-shaped conduit, as well as a projecting loop type structure (which is not essentially cantilevered in that it is not fixed to a rigid structure), are not properly referenced to circular type rotation. Additionally, the deflection or conduit movement due to the integrated Coriolis reaction forces on opposite sides of the applied oscillation are also not purely rotational at all positions on the conduit about a single (deflection) axis. Therefore, flow tube and sensing structures as known in the art which relate to the rotational aspects of the meter and passage of the conduit through stationary planes often do not produce the advantages in Coriolis force measurement as contemplated by their theoretical calculations.

Additional factors affecting the sensitivity and accuracy of known Coriolis type mass flow meters relate to the frequency of oscillation as applied to the flow meter conduit to create reaction. The flow meter conduits are essentially rigid structures which are oscillated at their fundamental natural vibrational frequency. However, machinery in the external environment of the Coriolis mass flow meter may create an external influence on the conduit structure which may significantly affect the readings made by the sensors used to measure the Coriolis reaction and, therefore, significantly reduce the accuracy and reliability of the mass flow determination. Additionally, since all known Coriolis type flow meters are operated at their fundamental resonant frequency or the first harmonic, contamination from these outside influences is always a factor on the sensitivity of the meter.

The geometry and the vibrational characeristics of known Coriolis flow meters often limit the measurability of the Coriolis reaction force and/or the overall sensitivity of the flow meter. More flexible flow tubes are desirable to increase sensitivity but flexibility often is provided at the expense of accuracy or overall performance characteristics. By reducing the thickness of the conduit wall of the flow tube to create a more flexible structure, the longevity and the operational safety of the meter may be compromised.

SUMMARY OF THE INVENTION

The present invention relates to a Coriolis type mass flow meter having an improved ratio of the measureable Coriolis reaction signal relative to the overall (internal and external) noise on the conduit and having a more flexible conduit design without sacrificing conduit integrity.

The flow meter of the present invention preferably contemplates a conduit having a centralized center of gravity positioned closely adjacent its mounting points to create a more stable oscillating structure which is less susceptible to signal contamination due to external noise or vibrational influences so that a more precise determination of the Coriolis reaction and the mass flow may be made. The present invention also preferably maximizes the moment arms of the resultant Coriolis force on the conduit tubing as well as provides a greater length of flow moving perpendicular to the motion of the driver at the end of the moment arm so as to increase the effect and the measurability of the Coriolis reaction force on the conduit tubing. An additional feature of the present invention contemplates an increase in the operating vibrational frequency of the meter so as to oscillate the flow tube at a resonant frequency higher than its natural fundamental resonant frequency so as to produce vibrational wave patterns or free-floating flexure points within the conduit shape. A substantially free floating and overall more stable conduit shape is contemplated to more precisely sense the Coriolis reaction and to stabilize the meter from the detrimental effects of external mechanical noise from the meter environment.

A preferred embodiment of the Coriolis mass flow meter as contemplated by the present invention includes a conduit having an inlet and an outlet adapted to communicate with a defined fluid stream or pipeline and positioned axial with the pipeline for receiving flow into the flow meter and returning or exhausting the flow back into the stream. The inlet and the outlet may be defined by a manifold and include a centrally positioned housing having internal channels which split or divide the inlet flow and converges the flow back into the outlet. The flow meter structure utilizes a dual tube type conduit design and contemplates a reduction in the overall size of the tubing required for proper operation. The inlet and the outlet preferably form a rigid structure positioned axially along the line of the fluid stream. Flexible flow tubes are rigidly attached at their ends to the housing and communicate with the internal channels of the housing and form symmetrical loops about the housing such that the center of gravity of the tubing shape is located closely adjacent or proximal with the mounting ends of the flow tubes. The inlet and outlet and the housing preferably define a relatively large mass, as compared to the mass of the conduit tubes (which are the vibrational portion of the flow meter). The dual flow tubes are preferably oscillated in an opposite mode so as to create opposingly directed Coriolis reactions, thereby increasing the overall measureable reaction on the flow tubes at any one point. The flow tubes are also preferably formed in a horizontally positioned "B" shape with their center of gravity and the mounting positions being defined at about the vertex of the two loop portions of the "B" shape. The loop portions form substantially 270° turns and are connected by a substantially straight connecting portion passing closely adjacent to the center of gravity below the housing. The loops are preferably provided with a large curvature so as to maximize the perpendicular component of the mass flow with respect to the direction of applied oscillation of the flow meter and the area or length of flow meter tubing on which the Coriolis force reacts. Additionally, relatively long moment arms are created by the loops about which the Coriolis force acts. The connecting portion joins the loops and is positioned substantially adjacent to the center of gravity so that the moment arm of the applied oscillation about the center of gravity and the mounting points of the tubing is relatively short as compared to the moment arms of the measured Coriolis reaction. The conduit design generally contemplates relatively long flow tubes, from their inlet end to outlet end, to increase the overall flexibility of the flow tube. This flexibility substantially increases the ability of the tubing to react in response to the Coriolis force by causing the conduit to torsionally deflect along its length without any substantial limitation from the preferably fixed mounting structure.

Sensing means of any convenient type may be provided for measuring the Coriolis reaction such as those which generate signals representative of the motion of the conduit. The symmetrically positioned sensors may be mounted directly to the conduit tube or tubes at opposite sides of the oscillating driver or may be mounted on extending arms which are fixed at one end to the housing and positioned adjacent the tubing at the other. Additionally, means for determining mass flow through the conduit as a result of the signals received from the sensors and as a function of the portion of the signals which are a component of the Coriolis reaction of the fluid may also be provided in any desired form.

An additional feature contemplated by the present invention relates to the operational oscillation of the flow tubes at a resonant frequency higher than their fundamental natural vibrational frequency. By oscillating the flow tubes at a relatively higher frequency than their fundamental resonance, the difference between the vibrational effect of external noise on the flow meter and the applied oscillation is more easily distinguished increasing the accuracy of the measurement of the Coriolis reaction. Additionally, by providing a flexible conduit structure which is preferably stable about its center of gravity, uniform vibrational wave patterns caused by the applied oscillation may be produced along the length,of the tubing, creating nodes which are similar to flexure points within the continuous tubing. The produced nodes are essentially free floating. A node is defined as a local minimum amplitude of vibration or stationary positions within the tubing, while the conduit structure surrounding the nodes vibrates. The wave patterns produced by the relatively higher operation frequency of vibration appear to cause. oscillation of the flow tube to be made about the node points. This displacement of the oscillation "axis" produces within the length of tubing a shock absorbing effect which minimizes the influence of unwanted noise on the Coriolis reaction measurement. The nodes are free floating flexure points which permit the flow tube to oscillate with out reference to a defined axis or the fixed mounting. Therefore, since all vibrations caused by external noise are transferred to the flow tube through the mounting points, the oscillation independent of the fixed mounting tend to absorb these unwanted vibrations and, therefore, further immunizes the flow tube and the sensing structure from this external noise.

An additional feature contemplated for use with the present invention relates to the application of the oscillatory motion of the flow tube so as to create the Coriolis reaction by the flow within the tube. The oscillating driver is preferably controlled by appropriate circuitry so as to produce the same amplitude of oscillation even where there is a variation in the density of the flow. Additionally, a driver structure as contemplated for use as part of the present invention will be mounted from a fixed structure adjacent to the flow tubes and oscillate the flow tubes without being directly attached to the tubes so as to avoid changing the resonance or dampen the motion of the flow tubes.

A Coriolis mass flow meter as contemplated by the present invention, improves accuracy in measuring the Coriolis reaction force by increasing the immunity of the sensor signals relative to the internal and external noise. Additionally, the the present invention contemplates an increased sensitivity by eliminating unsymmetrical distortions of the conduit shape. The improved Coriolis measurement accuracy also permits the use of stronger and more stable structural components which typically reduce the sensitivity of the meter to the Coriolis reaction in known structures. Therefore, the Coriolis mass flow meters of the present invention may be adaptable for use in measuring a number of fluids which are not typically applicable for use with known Coriolis type flow meters due to their pressure or flow characteristics or due to the limitations in making the Coriolis measurements by these known flow meters.

Further advantages of the invention will become apparent by particularly pointing out preferred embodiments of the subject invention. For the purpose of illustrating the invention, there is shown in the drawings a form which is presently preferred; it being understood, however, that this invention is not limited to the precise arrangements and instrumentalities shown.

DETAILED DESCRIPTION OF THE DRAWINGS

Figure 1:
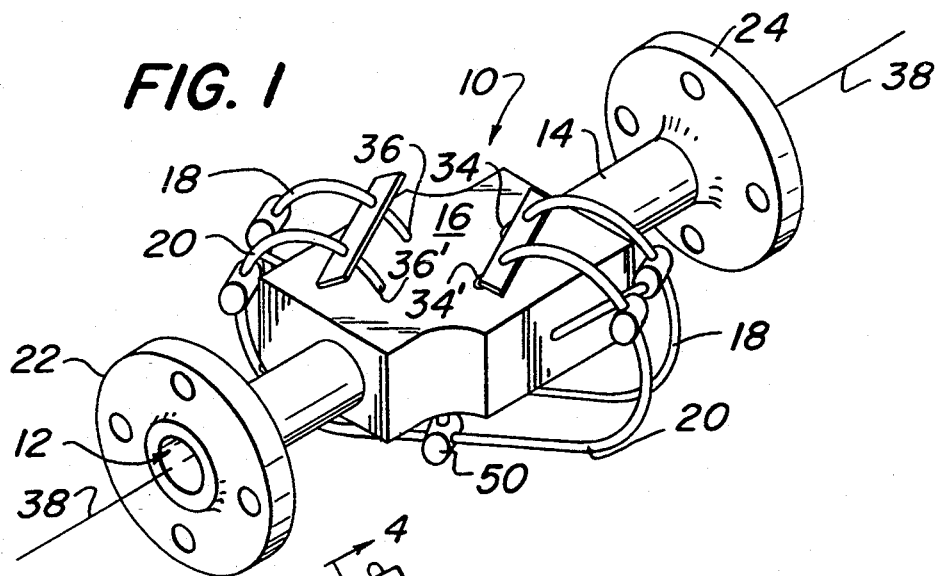
FIG. 1 shows a perspective view of a preferred embodiment of the Coriolis mass flow meter contemplated by the present invention.

In the drawings where like numerals indicate like elements, there are shown embodiments of a mass flow meter generally formed in conformance with the teachings of the present invention. One embodiment of the mass flow meter as illustrated in the drawings is referred to by the numeral 10 and is shown in FIG. 1. The flow meter 10 as shown includes an inlet manifold 12, an outlet manifold 14, a housing or central mounting block 16 and two generally B-shaped flow tubes 18 and 20. The inlet manifold 12 and the outlet manifold 14 include flanges 22 and 24, respectively, which are formed in anticipation of mounting the flow meter 10 within a defined fluid stream or pipeline (not shown). The inlet manifold 12 and outlet manifold 14 generally define an inlet and outlet to the flow tubes 18, 20 from the fluid stream and are preferably positioned coaxially with respect to one another as well as coaxial with the longitudinal axis 38 of the defined fluid stream.

Figure 2:
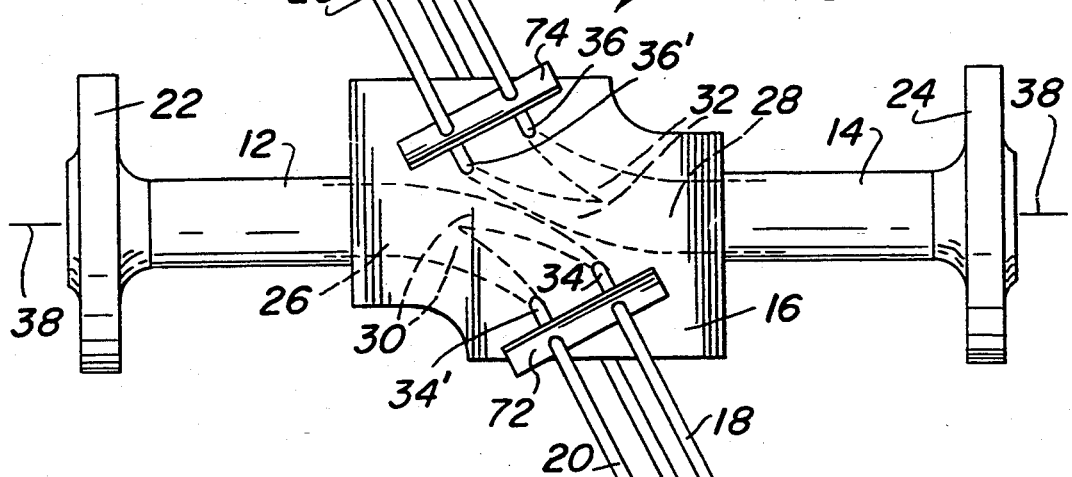
FIG. 2 shows a top plan view of the embodiment shown in FIG. 1.

The housing or mounting block 16 generally forms an inlet channel 26, which communicates with the inlet manifold 12, and an outlet channel 28, which communicates with the outlet manifold 14. The inlet channel 26 and outlet channel 28 are generally shown in FIG. 2 by way of dotted lines which indicate the internal structure of the housing 16. The inlet channel 26 generally forms a split 30 to divide the fluid flow passing through the housing 16 so as to feed substantially equivalent portions of the flow from the inlet manifold 12 into each of the two flow tubes 18, 20. The flow passes from the channel 26 and through the first flow tube 18 and second flow tube 20 in a substantially simultaneous and parallel relationship and is exhausted into outlet channel 28. A single exhaust flow is formed at the confluence or convergent portion 32 in the outlet channel 28 and is directed into the outlet 14. Inlet manifold 12, inlet channel 26, outlet channel 28, outlet manifold 14 and the connection between the channels 26, 28 and the two ends 34, 36 of each flow tube 18, 20 are preferrably formed with smooth internal surfaces so as to limit restriction or any adverse effects on the flow through the defined flow paths.

As particularly illustrated in FIG. 2, the flow tubes 18 and 20 may be positioned at a angle with respect to the axis line 38. The positioning of the flow tubes 18 and 20 with respect to the axis line 38. The positioning of the flow tubes 18 and 20 with respect to the axis lines of the defined fluid stream and the inlet 12 and outlet 14 manifolds may be made at any desired angle, including perpendicular or parallel (See FIGS. 6 and 7) to these axes. Additionally, the inlet manifold 12 and the outlet manifold 14 may also be offset (not shown) with respect to one another as desired. However, it is desired that there be a minimum of restriction of the fluid flow through the flow tubes so as to prevent adverse effects on the fluid as well as limiting the effects of turbulent flow or cavitation on the Coriolis reaction measurements.

Preferably, the first flow tube 18 and second flow tube 20 are substantially identical and are positioned adjacent and parallel. A single flow tube 18 will be herein described as representing both tube structures (as well as those illustrated in FIGS. 6 and 7 discussed below). In the drawings, the structure of flow tube 20 will be referred to by identical numerals with a prime postscript.

The inlet end 34 of flow tube 18 is fixedly attached to housing 16 so as to communicate with the inlet channel 26. The outlet end 36 of the flow tube 18 is also fixedly attached to housing 16 and communicates with the outlet channel 28. As shown in FIG. 2, the inlet end 34, outlet end 36 and the remaining portions of flow tube 18 are, preferably, positioned in a single plane. The conduit ends 34, 36, however, may be positioned adjacent the plane of the conduit by providing gentle curved sections (not shown) between housing 16 and the flow tube 18. It is preferred that at least a substantial portion of the flow tube 18 lie within a single plane and the remaining portions being closely adjacent thereto. It is also preferred that the meter 10 is positioned such that the plane of the flow tube 18 is perpendicular to horizontal so as to prevent uneven effects of the weight of the tube 18 and mass of the flow on the conduit movement and Coriolis reaction measurement. As shown, the inlet end 34 and outlet end 36 are attached to the housing 16 at positions which are closely adjacent or proximal to one another. End 34 of the flow tube 18 is positioned at the relative rear of the housing 16 (adjacent to the outlet manifold 14) with end 36 of the flow tube 18 communicating with the outlet channel 28 of the housing 16 (adjacent to the relative front or inlet end of the meter 10). By positioning the flow tube 18 in the manner shown, the flow from the inlet manifold 12 through the inlet channel 26 and into the flow tube 18 can be made without turning or redirecting the flow at sudden or extreme angles. Additionally, the flow exhaust from flow tube 18 can be directed into the outlet manifold 14 by a gradual turning through the outlet channel 28. Although the resulting structure of the flow meter 10 may vary according to any number of design characteristics, it is preferred that there be an overall minimum flow restriction created by the placement of the meter 10 within the pipeline.

Figure 4:
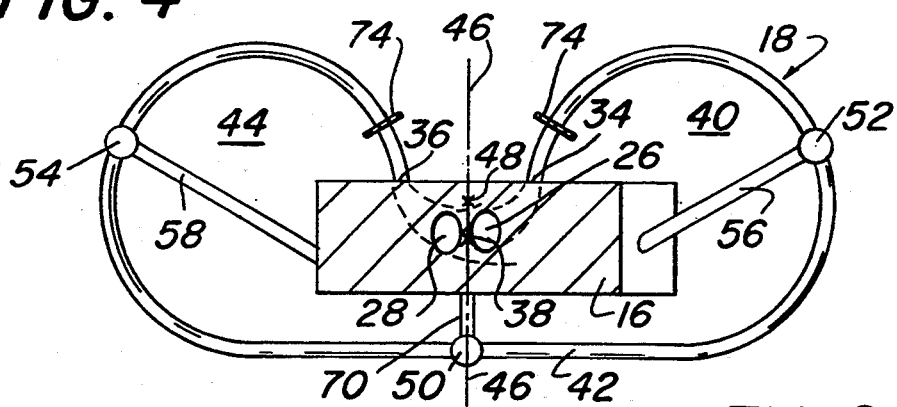
FIG. 4 shows a sectional view of the embodiment as shown in FIG. 3 taken along line 4—4 and includes an alternate sensor mounting structure as contemplated for use with the present invention.

As more particularly illustrated in FIG. 4, the flow tube 18 surrounds or loops around the housing 16 and preferably forms a horizontally positioned "B" shape. The tubing being mounted to the central block 16 at the vertex of the two formed loop or semicircular portions of the "B" shape. The flow tube 18 includes a first loop or deflection arm portion 40 which projects out the relative top of the housing or block 16 from end 34 and curves through an arc of preferably 270°, around the housing 16 to a position substantially below the center line 38. The first loop 40 communicates with a connecting portion 42 which generally extends from the first loop 40 on one side of the housing 16 and communicates with a second loop 44, which is similarly formed as loop 40, positioned on the opposite side of the housing 16. The connecting portion 42, is preferably, straight and passes the housing 30 closely adjacent thereto and, as shown, does not intersect axis line 38 of the inlet 12 and outlet 14 and the defined fluid stream. The relative positioning of the connecting portion 42 with respect to both the ends 34, 36 of the flow tube 18 (as well as with respect to the axis line 38) may be adjusted vertically with respect to housing 16 in either direction and in any desired manner. Additionally, connecting portion 42 is not required to be substantially straight as shown but may be curved according to any desired combination.

It is preferred that connecting portion 42 be positioned spaced from but closely adjacent or proximal to the center of gravity 48 of the flow tube 18. Additionally, the center of gravity 48 of the flow tube 18 is desirably positioned closely adjacent or proximal to the mounting of the flow tube ends 34, 36. The separation of mounting positions 34 and 36 and the connecting portion 42 from the center of gravity 48 is relatively less than the overall extension of the loops 40, 44 from the center line 46 of the flow tube 18.

The first flow tube loop 40 and the second flow tube loop 44 are positioned symmetrically about line 46. The first and second loops 40, 44 include a continuous arc which is preferably greater than 180° in curvature and, as illustrated, is approximately 270° from their respective ends 34 and 36. The joinder of the first loop 40 and second loop 44 is made by connecting portion 42. By providing large loops 40 and 44 which are displaced from the symmetry line 46 by a relatively large distance as compared to the overall displacement of the connecting portion 42 with respect to the center of gravity 48 (which lies along the symmetry line 46) a large moment arm is provided for the resultant effect of Coriolis force of the fluid acting on the flow tube 18 on either side of the applied oscillation by an electromagnetic driver 50.

The Coriolis reaction force generated by a flow in response to the flow tube 18 vibration by driver 50 is generally related to the mass density flow rate of the fluid, the velocity of the fluid within the conduit tubing and the rate of change of the slope of the curvilinear path of the fluid moving within the conduit. When a conduit is deflected perpendicular or transverse to the direction of the velocity of the fluid (for example, moving in the X direction) it is given an additional component of velocity which is also in a relatively transverse direction (i.e., the Y direction). Thus, a fluid particle moving within the flow tube 18 is moving in both the flow direction and the transverse direction (X and Y direction) or in a curvilinear path. The differential between the transverse motion of the particle (Y direction) with respect to and the flow movement (X direction) is equivalent to the slope of the curvilinear path. The rate of change of the slope of the curvilinear path with respect to time ($d^2y/dxdt$) is proportional to the Coriolis force. Since the flow tube 18 is, preferably, oscillated by driver 50 at the intersection of symmetry line 46 and connecting portion 42, the Coriolis force will be created substantially in opposite directions about this position (and with a gradient which is symmetrical) along the length of the flow tube 18.

Figure 6:
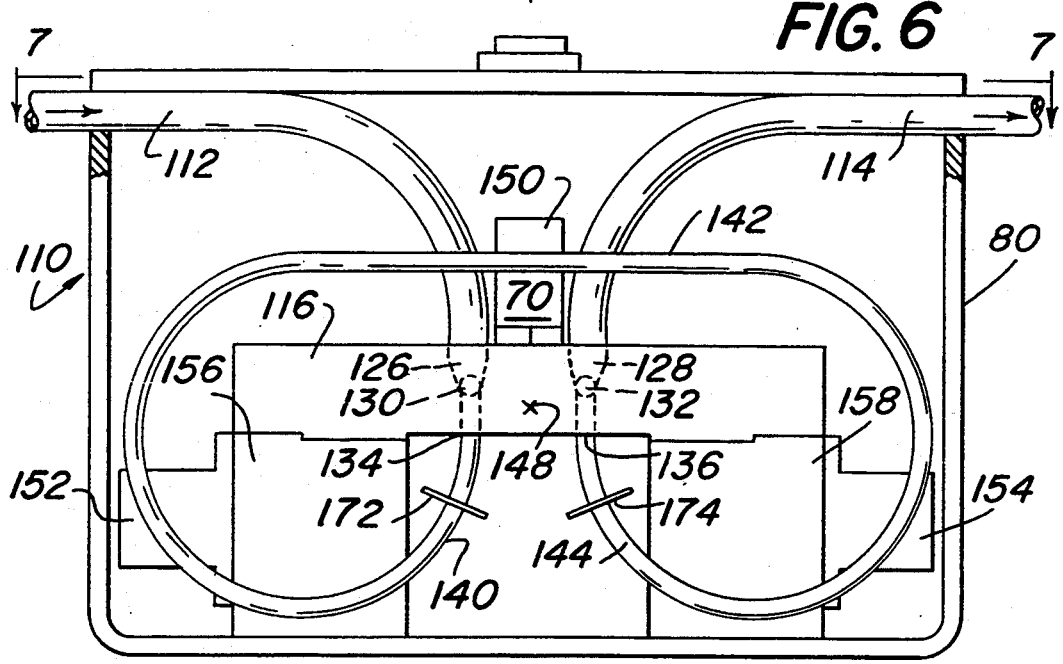
FIG. 6 is a side view of an alternate embodiment of flow meter contemplated by the present invention.
Figure 7:
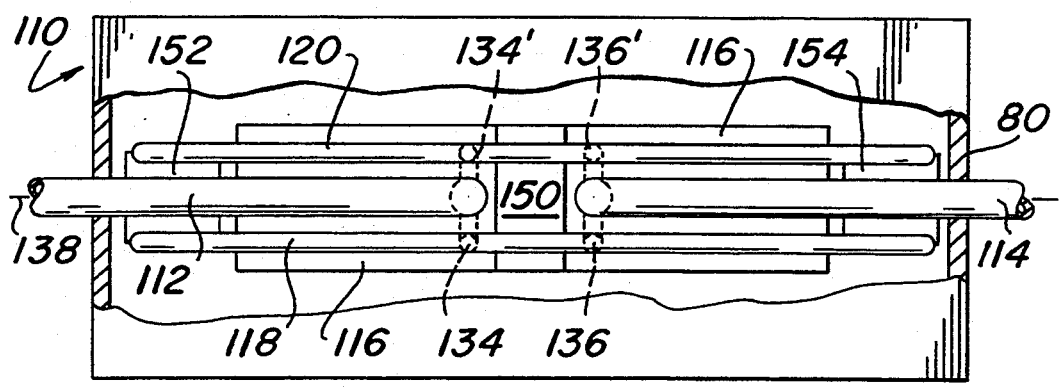
FIG. 7 is a top view of the embodiment in FIG. 6 taken along line 7—7.

Sensors 52 and 54 are positioned on the first loop 40 and second loop 44 respectively so as to measure the deflection of the flow tube 18 due to the Coriolis reaction force on the flow tube 18. The sensors 52, 54 may take any desired form as known in the art or may be made in conformance with the teaching of co-pending application Ser. No. 926,493, filed Nov. 4, 1986 titled "Method of Sensing and Structure for Determining Mass Flow" which is herein incorporated by reference. Sensing means of any convenient type may be provided for measuring the Coriolis reaction such as those which generate signals representative of the motion of the conduit. The symmetrically positioned sensors may be mounted directly to the conduit tube or tubes at opposite sides of the oscillating driver or may be mounted in extending arms which are fixed at one end to the housing and positioned adjacent the tubing at the other. Additionally, means for determining mass flow through the conduit as a result of the signals received from the sensors and as a function of the portion of the signals which are a component of the Coriolis reaction of the fluid may also be provided in any desired form. Also means for determining mass flow from the sensor signals is described in application Ser. No. 918,404 filed Oct. 14, 1986, and titled: "Method and Apparatus for Measuring Mass Flow." However, the present invention is not limited to the method and apparatus disclosed therein. The sensors 52, 54 may be attached directly to the flow tubes 18, 20 at adjacent positions (FIGS. 1 and 3) or may be mounted at the ends of mounting arms 56, 58 which extend from housing 16 to a position adjacent both flow tubes 18, 20 (FIG. 4 and FIGS. 6 and 7).

Loops 40 and 44 having a relatively large curvature and which are separated by connecting portion 42 provide a long conduit length which increases the overall flexibility of the flow tube 18 and the ability of the tubing to deflect in response to the Coriolis reaction force and enhance the measurability of these deflections. Additionally, the extension of the loops or deflection arms 40 and 44 from the symmetry line 46 generally increase the effect of the Coriolis reaction about the symmetry line 46 creating a more torsional type bending of the flow tube 18 in response to the Coriolis force. The resultant motion of the tubing will be a result of the reaction gradient and the conduit shape. The increase in torsional bending is a result of the long length as well as the shape of the flow tube 18 which bends in response to the Coriolis force gradient. The large loops 40, 44 also increase the amount of flow moving in a direction with a component perpendicular to the flow direction at the driver 50, which increases the area on which the Coriolis force may act on the flow tube 18 thus increasing the measurable dynamic effect of the Coriolis reaction over the length of the loops 40 and 44 so as to distinguish from the applied oscillation of driver 50. The loops 40 and 44 do not "rotate" about the line of symmetry 46 or their mounting ends 34, 36 but deflect torsionally due to the overall flexibility of the flow tube 18. Additionally, since the flow tube 18 is symmetrical about its center of gravity the vibration of the tube 18 is uniform at all points and substantially uncontaminated by outside noise. The sensing of the Coriolis reaction on flow tube 18 is contemplated to be made with respect to the motion of the flow tube 20 and, therefore, the need to fix an axis of deflection for measurement purposes is essentially eliminated.

The flow tube 18 as contemplated by the present invention preferably positions its center of gravity closely adjacent or proximal to its mounting positions 34 and 36. The conduit does not project from its mount at ends 34, 36. The shape of the flow tube 18 surrounds the center of gravity 48 as well as its mounting ends 34, 36. This formation of the center of gravity 48 of the flow tube 18 closely adjacent or proximal to its mounting position 34 and 36 reduces the effect of external noise and uneven vibrations on the flow tube 18. The flow tube 18 is stable with respect to its mounting positions 34, 36 and, therefore, external noise does not significantly contaminate the sensing of the Coriolis reaction by sensors 52 and 54. The flow tube 18 shape is a more stable environment for separating the Coriolis reaction from the applied oscillation of the driver 50 and therefor the mass flow calculation is further enhanced.

A relatively long flow tube 18 provides a substantially flexible structure which is free to deflect in response to the Coriolis reaction and, therefore, increases sensitivity of the meters. Additionally, by providing a flexible flow tube structure along with a more stable shape, the tubing may be provided with relatively heavy thicknesses. Although heavier tubing will reduce the overall flexibility of the flow tube and, thus, reduce the magnitude of the tube deflections in response to the Coriolis reactions, the overall sensitivity of the meter 10 is not sacrificed since the measured reactions are essentially immune to external noise due to the stability of the flow tube 18. The increase in wall thickness increases the overall strength and longevity of the meter 10 and permits the meter to be utilized with fluids under a relatively high pressure as well as permits an increase in the overall safety of operation of the meter 10.

Driving the flow tube 18 adjacent to the center of gravity 48 also stabilizes its vibration characteristics as well as its response to the Coriolis reaction force. The further the distance that the driver 50 is extended away from the center of gravity 48 the more likely that the driver will cause distortions in the motion of the applied oscillation and, thus, effect the flow tube motion seen by the sensors 52 and 54. The spacing between the driver 50 and the center of gravity 48 can be varied in consideration of other design factors, such as overall conduit length, position of the center of gravity with respect to the mounting ends 34, 36, the extension of the deflection arms 40, 44 from the line of symmetry 46, etc. Additionally, by repositioning the connecting portion 42 with respect to the center of gravity 48 along the symmetry line 46 the center of gravity in the overall flow tube 18 design may also be repositioned with respect to the mounts 34, 36 as desired.

Further, stabilization of the meter 10 may be provided by the housing 16 and manifolds 12, 14, which, preferably, form a relatively large mass as compared to the mass of the flow tubes 18 (including flow tube 20). The flow tube 18 is relatively free floating due to its flexibility and positioning about the relatively large central mass and its mounting ends 34, 36. The large mass of the housing is preferably located at the center of gravity 48 of the flow tube 18 which further immunizes the tubing from the effects of external noise and unsymmetrical distortions on the measurements of sensors 52 and 54. Additionally, the flow tubes 18, 20 are not suspended from the inlet 12 and outlet 14 of the meter 10 and these ends are positioned relatively close to one another to create a more compact environment of operation so as to not be subject to large vibrational amplitudes caused by external noise.

Brackets 72 and 74 may be provided between the flow tubes 18, 20 and are positioned adjacent to the relative ends 34, 34' and 36, 36', respectively. Brackets 72, 74 generally form a pivot about which the loops 40 and 44 deflect. Brackets 72 and 74 are generally utilized to limit the effect of the oscillatory motion of the conduits 18 and 20 on the joint between the flow tubes 18, 20 and the housing 16.

An alternate embodiment of the flow meter 110 to that shown in FIGS. 1 to 4 is illustrated in FIGS. 6 and 7. The flow meter 110 as shown generally forms the same flowtube 118,120 structure to that shown in FIGS. 1 to 4 but is mounted to a housing 80 at a position away from the longitudinal axis line 138 of the defined fluid stream or pipeline (not shown). The inlet 112 and outlet 114 of the flow meter are mounted at one end to the housing 80 and at their opposite and to the central mounting block 116. Central mounting block 116 is attached to the housing 80 by means of arms 156 and 158 so as to position the block 116 within the interior of the housing 80.

Central mounting block 116 forms an inlet channel 126 which receives flow from inlet 112 and directs it into both flow tubes 118 and 120 through their mounting ends 134, 134' (respectively) and divides the flow at split 130. The flow tubes 118 and 120, as shown, substantially direct the flow in the same manner so flow tubes 18 and 20 in FIGS. 1 to 4 and include loops 140 and 144 as well as converting portion 142 and forms a center of gravity 148 substantially adjacent mounting ends 134 (134') and 136 (136') of the flow tubes 118 (120). The flow exhausting from flow tubes 117 and 120 is directed through channel 128 and converged into a single flow at 132 and back into the flow stream or pipeline (not shown) through outlet 114.

The flow tubes 118 and 120 lie in preferably adjacent and parallel planes which are also parallel to line 138. the channels 126,128 within block 116 are required to direct the flow only slightly from the inlet 112 and outlet 114 with respect to the plane of the flow tubes 118, 120 which are preferably spaced closely adjacent one another.

Figure 3:
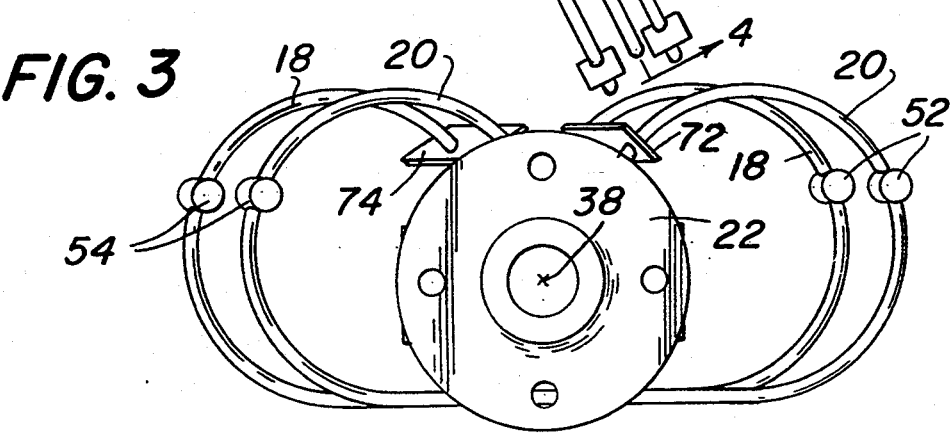
FIG. 3 shows a side plan view of the embodiment shown in FIGS. 1 and 2.

Arms 156 and 158, which support the block 116 (as well as the flow tubes 118,120) within the housing 80 additionally support the sensors 152,154 between respective loops 140,144 of flow tubes 118,120. Again, sensors may take any form as desired or may be attached directly to the flow tubes 118,120 (as shown in FIGS. 1-3). Additionally, driver 150 may also be mounted to the fixed housing structure 80 by means of arms 156,158 and block 116. As shown, driver 150 is mounted to a position between the two connecting portions 142 of flow tubes 118 and 120 by means of arm 170 (similar to arm 70 shown in FIGS. 1 and 4). A driver 150 (50) as contemplated for use as part of the invention herein is described below.

Oscillation of the Conduit

The overall conduit shape as contemplated by the present invention is designed to limit the effect of external noise and internal distortions on the oscillatory motion of the flow tubes 18, 20 (118,120) so as to create a stable structure and produce a precise measurement of the reaction on the loops 40, 44 due to the Coriolis force and as seen by the sensors 52 and 54. Typically, sensors 52, 54 are mounted symmetrically about the driver 50 and measure substantially equal and opposite reactions on each loop 40, 44 due to the nature of the Coriolis reaction force gradient about the applied oscillation.

The motion of the flow tubes 18, 20 in response to the applied oscillation of the driver 50 will be affected by the Coriolis reaction which will either resist or add to the flow tube motion during each vibrational stroke. The overall motion seen by the sensors 52 and 54 during operation of the flow meter 10 is processed by any desired method to provide the mass flow determination. One known method of determining mass flow from these signals is to determine the time differential of the signals corresponding to the motion of the opposite side loops 40 and 44. Practical time differentials of the two sides of the flow tube 18 considering known hardware and considering limitations on the materials utilized for the tubing are in the neighborhood of 10 to 100 microseconds (or greater). However, it has been determined that small signal differentials (corresponding to small Coriolis reactions or to higher frequencies of operation) are acceptable if the sensor signals are generally uncontaminated by outside noise. Generally, in known flow meters the signals produced by the sensors 52, 54 are noisy if the overall deflection due to the Coriolis force on the flow tube is limited. The more flexible the tubing or flow tube design the greater the deflection of the flow tube in response to the Coriolis reaction (i.e. greater sensitivity) and, therefore, the greater the time or signal differential. However, in known flow meters the internal and external noise will also have a greater effect on a more flexible flow tube and therefore contaminate these sensor signals.

Heretofore, it has generally been known to oscillate the known flow meter conduits at their fundamental natural resonant frequency. This fundamental frequency for operating the flow meter 10 is also applicable to the flow tube shape and design as contemplated by the present invention. The present invention limits the effect of the outside noise on the flow tube 18 as seen by the sensors 52 and 54 at the sacrifice of sensitivity to Coriolis reaction force deflection of the flow tube. It has been determined that by vibrating the flow tube at a relatively higher frequency of oscillation than its first or fundamental resonance, further immunity to outside noise can be maintained while also providing more accurate mass flow determination.

A typical problem affecting known flow meters in the working environment is that the fundamental resonant frequency of a flow tube is relatively close to the overall vibrational effect on the meter of the external noise in the meter environment. Rotating machinery as well as other mechanical vibrational influences may be operating at a frequency close to that of the fundamental resonance of the flow meter conduit and may significantly contaminate the sensor signals. By operating the flow meter at a relatively higher frequency than its fundamental resonance, the noise produced in the flow meter environment and the motion seen by the sensors 52 and 54 (and thus, the Coriolis reaction) will be more easily distinguishable.

FIGS. 5A, 5B, 5C and 5D show the shape of a flow tube as contemplated by the preferred embodiment of the present invention. A number of natural resonant frequencies are identifiable within this shape and design, with each having a distinct oscillation pattern. The three oscillation or wave patterns, as shown in FIG. 5 generally relate to the modes of oscillation of the first three resonant frequencies of the flow tube between its fixed mounting points 34 and 36.

Figure 5A:
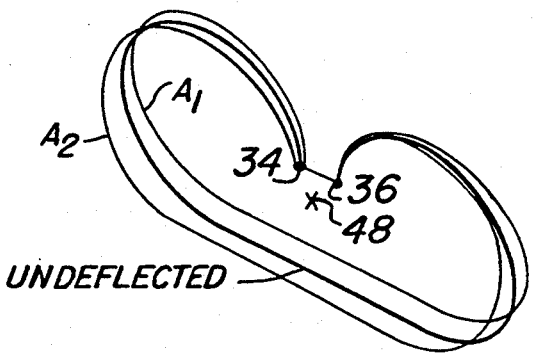
FIGS. 5A, 5B, 5C show various resonant vibration patterns of the flow meter tubing of the embodiment shown in FIGS. 1-4.

FIG. 5A illustrates the oscillation pattern of the fundamental resonant vibrational frequency of the flow tube 18. At this vibrational frequency the entire conduit shape generally deflects about the fixed mounting points 34 and 36 and its center of gravity 48 (as shown by lines A1 and A2). The maximum displacement of the flow tube from its undeflected position is substantially at connecting portion 42.

Figure 5C:
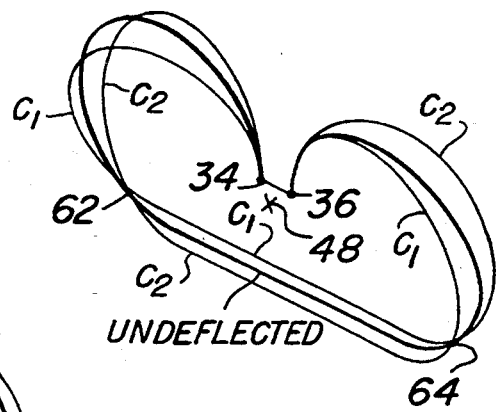
Figure 5B:
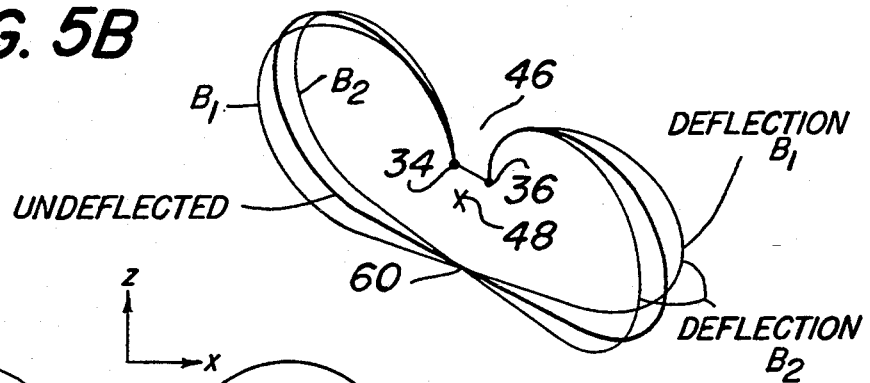

The deflection or vibrational pattern B1, B2 of the second resonant vibrational frequency is illustrated in FIGS. 5B. The flow tube in this mode oscillates about the fixed mounting points 34 and 36, and the line of symmetry 46. The oscillatory pattern B1 and B2 is obtainable by vibrating the free floating flow tube in space when mounted at its ends 34, 36 and not necessarily by a driver positioned at the intersection of symmetry line 46 and connecting portion 42. A node 60 is generally formed within the oscillatory pattern at the symmetry line 46 of the flow tube shape. Node 60 is a local minimum amplitude of vibration formed in response to the applied vibration and is substantially in space with the remaining portions of the flow tube oscillating towards a maximum amplitude between the node 60 and the fixed mounting points 34 and 36. The maximum displacement of the flow tube in response to the applied vibrations is somewhere between the fixed points 34, 36 and the node 60 with all vibrations, ideally, symmetrical about the nodal point 60. In an environment without external noise and with no flow through the tubing, the node 60 will be substantially stationary. However, a node is anticipated to be moveable due to the influences of the Coriolis reaction without substantially altering the vibrational patterns B1, B2 as illustrated.

Figure 5D:
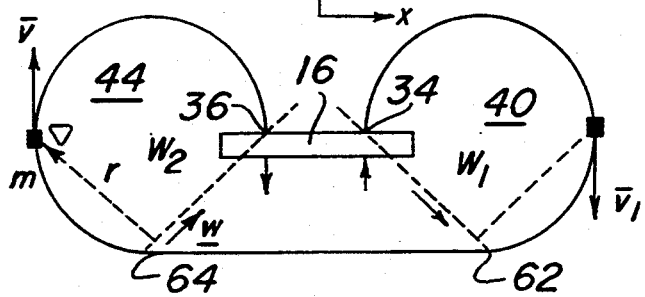
FIG. 5D and 5E show top and side plan views of the oscillation pattern shown in FIG. 5C.
Figure 5E:
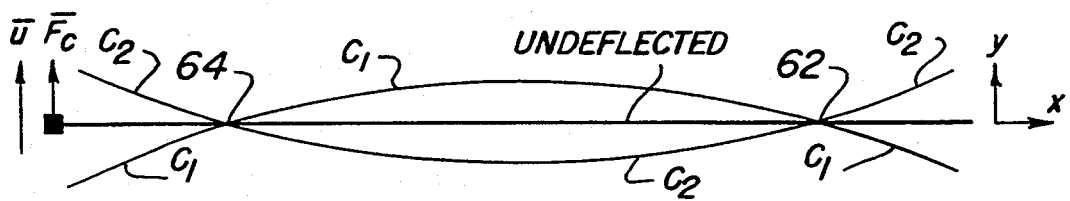

FIGS. 5C and 5E illustrate the pattern of the third resonant frequency of the flow tube with the applied vibrations forming waves along the length of the tubing. Two nodes 62 and 64 are produced and are positioned at opposite ends of the connecting portion 42. The nodes 62, 64 form a local minimum amplitude of vibration within the tubing that simulate a pivot about which the continuous uniform tubing appears to flex. A comparison of a node may be made to a free floating ball and socket type joint with extensions being made from both sides with the socket. There are no welds or articulations, such as bellows or flexible joints, required within the length of the tubing in order to create this flexing node pattern.

Vibrational wave patterns along a generally flexible tubing, as shown or as contemplated by the present invention are the summation of the torsional and longitudinal components of all the vibrational patterns of the flow tube shape. The manner of deflection of the tubing and the position of the nodes within the length of the flow tube will be a percentage contribution of all the components of the oscillation patterns (including the other relatively higher resonant frequencies not shown). This summation is generally referred to as a participation factor. This participation factor is greatly affected by the shape, length and structural materials of the conduit flow tube; i.e. the flexibility of the flow tube. Additionally, the total displacement of the conduit will be a summation of the percentage of each mode's contribution (as well as the contribution of the Coriolis reaction and external vibrational influences.

The Coriolis reaction is in the form of a gradient along the length of the flow tube 18 with a resultant force acting on the flow tube at positions opposite sides of the nodes 62, 64. In defining the Coriolis reaction gradient with respect to the nodal type oscillation, as illustrated in FIGS. 5C and 5D, the greatest Coriolis reaction of the fluid will be created at the nodes 62, 64. The rate of change of the slope per unit time (i.e., angular acceleration) of the flow within the vibrated tubing is a maximum at the node 62, 64 because the flow at those points is continuously changing direction at a greater rate than the flow in the remaining portions of flow tube which are oscillating about the nodes. The flow tube portions surrounding the nodes include a time differential to make the back and forth oscillation (C1, C2) and, therefore, have a lesser change in displacement and a correspondingly lower Coriolis reaction. (This Coriolis reaction at the nodes 62, 64 can be compared to the reaction gradient on a straight tube as illustrated in FIG. 1 of Sipin U.S. Pat. No. 3,329,019 where the maximum force of the Coriolis force gradient is adjacent the fixed input and output ends.) The sensors 52, 54 may be positioned at any desired location at symmetrical positions with respect to the driver motion preferably between the nodes 62, 64 and the mounting positions 34 and 36 (or brackets 72 and 74) so as to determine the movement of the loops 40, 42 (respectively).

Further isolation of the flow tubes from external noise is created by driving or oscillating the tubes at a resonance above its first harmonic. The nodes 62, 64 create a stabilization of the tubing by defining a position which acts as a flexure point for the bending of the flow tube and does not translate due to external disturbances or noise. In operating at the fundamental resonance the bending of the flow tube is related directly to its attachment to housing 16 and which is subject to translation due to external noise.

As expressed previously there is no definative oscillation axis about which the tubing rotates because the tubing is moving at each point in a separate arcuate path and not in a circular path about its fixed mounting or oscillation point. The determination of the isolation characteristics produced by the nodal type bending of the flow tube at a higher resonant frequency of applied oscillation is more easily explained by applying "the right hand rule" to the formation of the Coriolis reaction of the flow within the vibrating conduit. However, in applying this rule, the bending positions will be utilized as a means for positioning the axis required by the "right hand rule" approach.

As shown in FIGS. 5D and 5E there are two bending axes W1, W2 which are generally defined by the nodes 62, 64 when the flow tube is vibrated at the second harmonic or third resonant frequency of oscillation. The flow is moving through the tubing from the input end 34 to the output end 36. The Coriolis force in loop 40 is a result of the vector cross product of the velocity and W1 and in loop 44 is the result of the velocity cross W2. When the driver (which is positioned, typically at the center of connecting portion 42) is deflecting the flow tube downward, as shown by line C2 in FIG. 5E, the loops 40, 44 will both be deflected upwards on the opposite sides of nodes 62, 64. Since the Coriolis force is always acting through the nodes 62, 64 as a function of the cross product, the resultant force is not a function of any external disturbances acting on these points 62, 64. Thus, the Coriolis force acts to enforce or retard the deflections of the flow tube caused by the driver depending on their phase of motion C1, C2 and will be purely a function of the velocity and the tube deflections and not a further result of the participation of external disturbances on the flow tube motion.

The overall flow tube shape, which positions its center of gravity 48 proximal to its mounting positions and surrounds this mount (and is not suspended therefrom), stabilizes the conduit motion so that all vibrations, both external and otherwise, act on the flow tube uniformly so as to produce a more precise sensor signal of the Coriolis reaction. The driving of the flow tube at a non-fundamental resonant frequency further enhances the accuracy of the flow meter by immunizing the Coriolis reaction generation from the external noise.

Figure 8:
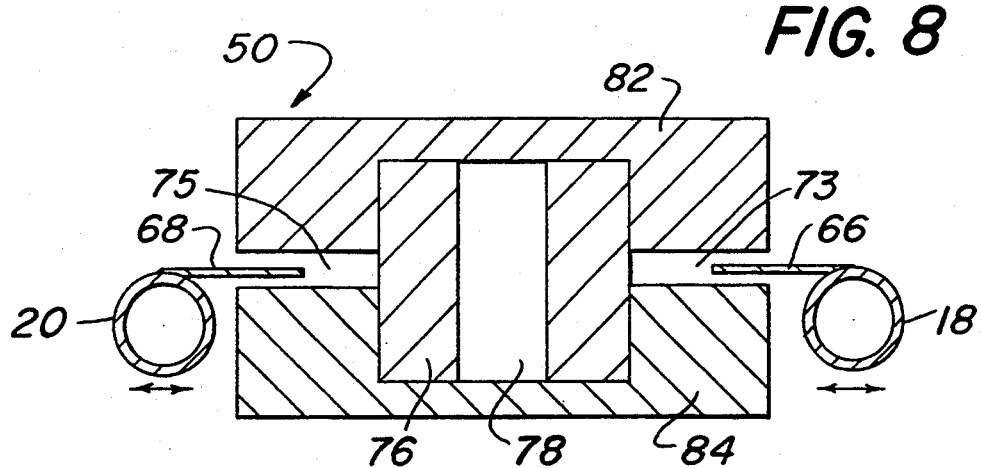
FIG. 8 is a cross-sectional view of a driver for use with a dual tube type flow meter as contemplated for use as part of the present invention.

The driver 50 which is utilized to create the oscillatory motion of the flow tubes 18, 20 (118, 120) may be any convenient type or may be of the structure as shown in FIG. 8. Additionally, since the oscillatory frequency is important to the generation of the Coriolis force as well as the wave patterns when oscillated at non-fundamental resonant frequency, control of the oscillation force is also desired. A control circuit is shown in FIG. 9 and may form a part of the invention herein.

The driver 50 shown in FIG. 8 is positioned between the two flow tubes 18, 20 and preferably oscillates the tubes in an opposite mode. Each tube 18, 20 is provided with a tab 66, 68 which preferably include permanent magnets. The tabs 66, 68 fixedly attached to the external wall of the tubing and project into an air space 73, 75, respectively, on the opposite sides of the driver 50. The air spaces 73, 75 define a magnetic flux area which causes the tab 66, 68 to be either repelled from or attracted into the air space 72, 74 upon energization of the driver 50. The changing of the state of the driver is created by applying an alternating current to coil 76 having core 78. On opposite sides of the coil 76 and core 78 are two fixed plates 82, 84 which surround the coil 76 and core 78 and define air spaces 72, 74. Thus, the driver 50 may be positioned to oscillate the flow tubes 18, 20 without being attached directly to its structure which may act to dampen or unbalance the motion of the tubes or change their natural vibrational frequency.

Figure 9:
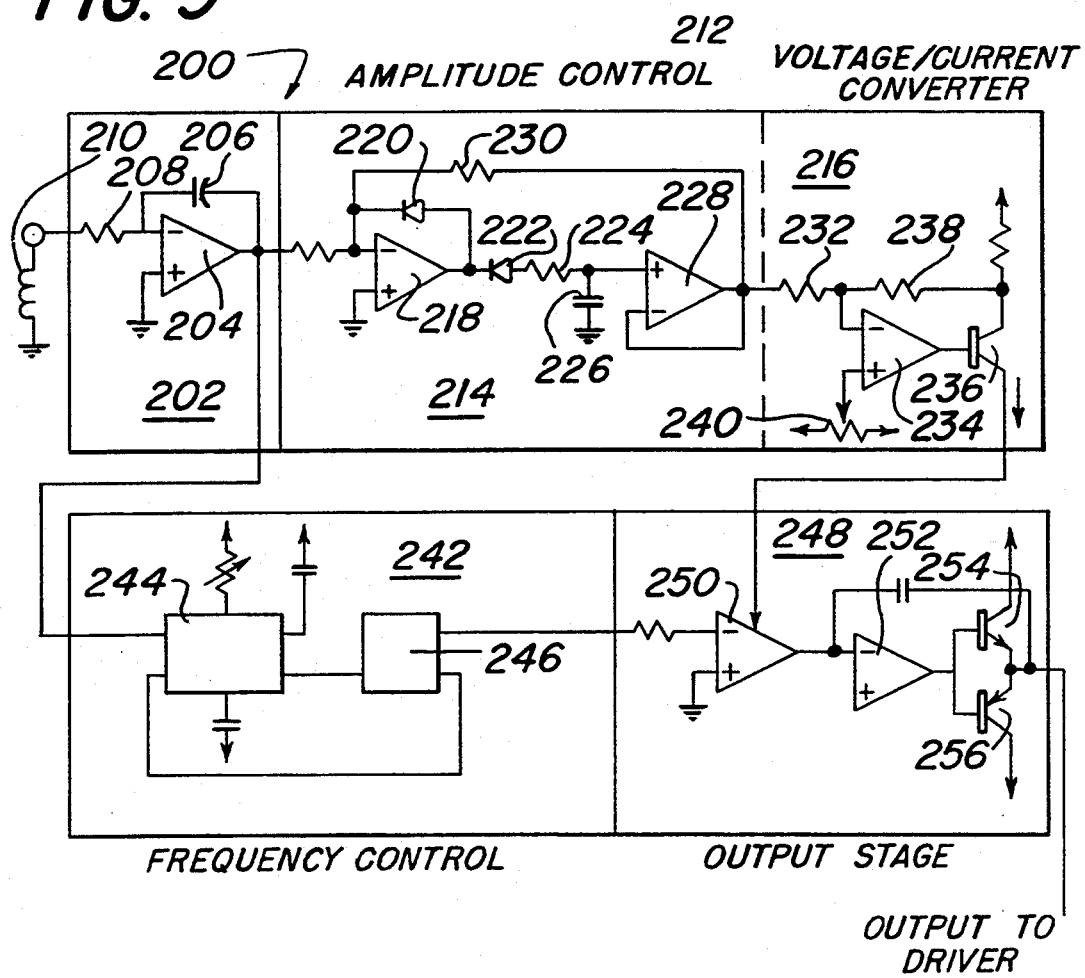
FIG. 9 is a schematic of a driver circuit as contemplated for use as part of the present invention.

A preferred driver circuit for oscillating the flow tubes 18, 20 is schematically illustrated in FIG. 9. The function of the driver circuit is to oscillate flow tubes 18, 20 at a preselected frequency selected in order to minimize the influence of external vibration on the motion of flow tubes 18, 20. The geometry of the flow tubes permits stable oscillation at several frequencies and their harmonics. The circuit of FIG. 9 provides reliable oscillation of the flow tubes at the preselected frequency for any fluent medium flowing through the mass flow meter. The circuit provides constant amplitude oscillation regardless of the density of the fluent medium to avoid nonlinearities due to differences in density and flow characteristics.

The driver circuit 200 generates a driving signal in the form of a triangular wave symmetric about a reference voltage of zero volts. The frequency of the triangular wave is the preselected vibrational frequency of flow tubes 18, 20. Driver circuit 200 comprises four stages, each of which is described in turn below:

(1) input stage, including a precision input integrator;
(2) amplitude regulating stage, including a precision negative peak detector and a voltage-to-current converter;
(3) frequency regulating stage, including a phase-locked loop; and
(4) output stage, including an operational transconductance amplifier and precision output integrator.

Input stage 202 comprises an operational amplifier 204 and capacitor 206 arranged as an integrator. An input resistor 208 connects the negative input of operational amplifier 204 to a sensing coil 210, which senses the velocity of flow tube 18. Although a sensing coil 210 is illustrated, it will be recognized by those skilled in the art that a piezoelectric sensor (to sense acceleration of tube 18) or a glass fiber optical sensor (to sense displacement of tube 18) may be used in place of sensing coil 210 without departing from the invention.

In the illustrated embodiment, the voltage induced in sensing coil 210 by movement of tube 18 is proportional to the velocity of the oscillation (i.e., dy/dt, FIG. 5E). To obtain a voltage proportional to displacement (in order to keep the amplitude of vibration in the proper phase), the voltage induced in sensing coil 210 is integrated in operational amplifier 204 and capacitor 206. Thus, input stage 202 produces an electrical signal representative of the displacement of tube 18. Typically, this signal will be a voltage on the order of 500 mV. It should also be noted that, since velocity is sensed, changes in amplitude of the motion of tube 18 due to external effects is virtually eliminated.

The output signal from input stage 202 is then sent to both the amplitude regulating stage and the frequency regulating stage.

Amplitude regulating stage 212 comprises a precision negative peak detector 214 and voltage-to-current converter 216. Amplitude regulating stage 212 produces a current which is supplied to the output stage for processing to obtain the drive voltage for driver 50. The amplitude of the current is regulated by precision negative peak detector 214, which consists of operational amplifier 218 and diodes 220 and 222. The output of the peak detector is supplied to driver amplifier 228 through RC network 224 and 226. The output of driver amplifier 228 is fed back to the inverting input of operational amplifier 218 by resistor 230.

The output of driver amplifier 228 is supplied to voltage-to-current converter 216 via resistor 232. Voltage-to-current converter comprises an operational amplifier 234, transistor 236 and feedback resistor 238. The zero point of the operational amplifier 234 can be chosen by potentiometer 240. The slope of the conversion can be determined by resistors 238 and 232 in known manner. As will be readily understood, changes in the output of operational amplifier 234 as a result of changes in the output from peak detector 214 will vary the conductance of transistor 236. This will result in a change in the collector current of transistor 236 which is directly proportional to the change in voltage at the output of peak detector 214.

The output of peak detector is kept at a constant voltage in order to assure a constant current from voltage-to-current converter 216 to the output stage.

The control voltage for voltage-to-current converter 216 is derived from the integrated output signal from integrator 202 in peak detector 214. The integrated output is inverted in amplifier 218 and applied to storage capacitor 226, which changes the negative peaks of the integrated output signal. The voltage across capacitor 226 follows the envelope of the integrated output signal, but holds the negative peak values since capacitor 226 cannot discharge negative voltages because of diode 222. Capacitor 226 will thus detect and hold the negative peaks of the integrated output signal.

The voltage across capacitor 226 is applied to voltage follower amplifier 228, which in turn drives voltage-to-current converter 216. As will be seen, increases in the negative peaks cause the current output of transistor 236 to decrease, causing a decrease in the output to driver 50, which in turn reduces the displacement of flow tube 18.

As already noted, the integrated velocity signal from input stage 202 is also sent to frequency regulating stage 242. Frequency regulating stage 242 comprises a conventional integrated phase locked loop (PLL) circuit 244. Preferably, PLL 244 is run at a multiple of the preselected drive frequency, which is then divided by a conventional divider circuit 246. Running PLL 244 at a multiple of the preselected drive frequency offers several advantages: (1) at a higher frequency, smaller capacitors can be used, allowing the circuit to be made more compact; (2) a wider range of driving frequencies is available simply by selecting the degree of division from the divider circuit 246; and (3) the different phase shifts between the sensor signals (0° for position sensors, 90° for velocity sensors and 180° for acceleration sensors) and the output signal can be readily achieved.

The controlled frequency output of frequency regulating stage 242 is then supplied to output stage 248 along with the output of amplitude regulating stage 214. The current from amplitude regulating stage is amplified by operational transconductance amplifier 250 and then supplied to a precision power integrator comprising amplifier 252 and transistor pair 254, 256 arranged as a Class B amplifier. The output of Class B amplifier is supplied to driver 50 to drive flow tubes 18, 20. It will be appreciated that the amplitude of the output is proportional to the current from voltage-to-current converter 216, and the frequency of the output is determined by the PLL 244. Switching of the current is performed by operational transconductance amplifier 250.

Driver circuit 200 offers several advantages not heretofore available:

(1) A triangular waveform does not contain paired upper harmonics.
(2) The circuit offers a high figure of merit which results in low harmonic distortion of the voltage induced in the sensing coil.
(3) By changing the input current to the output integrator, effective yet easily realizable amplitude regulation can be obtained.
(4) Using an operational transconductance amplifier simplifies switching the input current in and out of the output integrator.

The presently contemplated invention increases the accuracy of the meter by increasing the measureable effect of the Coriolis reaction on the flow meter conduit and stabilizing the oscillation of the flow tubes by defining an improved geometry so as to increase the relative signal to noise ratio. The present invention also increases accuracy of the mass flow determination by increasing the frequency of operation. The overall effect of the improvements as contemplated by the present invention is to provide a more accurate mass flow determination which is practically produced, useful with a large variety of fluids and applicable to a number of hostile environments.

The present invention may be embodied in other specific forms without departing from the spirit or essential attributes thereof and, accordingly, reference should be made to the appended claims, rather than to the foregoing specification, as indicating the scope of the invention.

We claim:

1. In a Coriolis mass flow meter having a flow tube oscillated transverse to the direction of the flow therein, sensors mounted on or adjacent the flow tube located symmetrically with respect to one another, the sensors generating signals representative of the motion of the flow tube, and means for determining the mass flow through the flow tube from said signals, comprising: means for vibrating the flow tube at a resonant frequency higher than its fundamental natural resonant frequency to produce a vibrational pattern of translation that varies along the flow tube length, and means defining an inlet and an outlet for flow from a defined fluid stream into and out of the flow tube, the flow tube fixedly mounted to said inlet and outlet means so as to stabilize said flow tube around its center of gravity and said inlet and outlet means, wherein the mounted ends of the flow tube are juxtaposed to the center of gravity of the flow tube, the flow tube generally forming a horizontally positioned "B" shape, the vertex of the "B" shape being fixedly mounted to and in communication with the inlet and outlet means, and wherein two nodal points are created within the length of the flow tube by the transverse oscillation of the vibrating means about which the flow tube flexes.

2. In a Coriolis mass flow meter as claimed in claim 1 wherein one sensor generates a signal representative of the motion of the flow tube between one said nodal point and one of the mounting ends of the flow tube, and a second sensor positioned on the opposite side of the flow tube generating a similar signal.

3. In a Coriolis mass flow meter for measuring the mass flow rate of a fluid within a defined fluid stream comprising: a conduit having an inlet for receiving flow from the stream and an outlet for returning flow to the stream, the inlet and the outlet rigidly fixed with respect to one another and forming a manifold; a continuous, flexible flow tube communicating with and fixedly mounted at respective ends to the manifold, the flow tube formed symmetrically with respect to the inlet and the outlet and having an overall center of gravity juxtaposed to its mounting to the manifold, the manifold including a central housing for directing the flow from the inlet into the flow tube and directing the exhaust from the flow tube to the outlet; means for vibrating the flow tube transverse to the direction of the flow within the flow tube, the vibrating means located at a point on the flow tube that is spaced from but closely adjacent the center of gravity of the flow tube, the vibrating means oscillating the flow tube at a resonant vibrational frequency thereof higher than its fundamental resonance so as to produce at least two nodes on the flow tube; sensor means for generating signals representative of the motion of the flow tube, the sensor means mounted between one said node and the connection of the flow tube with the manifold; and means for determining the mass flow rate of the fluid directed through the conduit by determining the portion of said signals which are a component of the Coriolis reaction of the flow in response to the oscillation of the vibrating means.

4. In a Coriolis mass flow meter as claimed in claim 3 wherein the flow tube generally forms a horizontally positioned "B" shape with the vertex of the "B" fixedly mounted to the manifold and communicating with the inlet and the outlet, respectively.

5. In a Coriolis mass flow meter as claimed in claim 4 wherein the loops of the "B" shape form an arc of approximately 270°.

6. In a Coriolis mass flow meter comprising: two substantially identical free floating, flexible and continuous flow tubes juxtaposed to and parallel to one another, and said flow tubes receiving substantially equivalent flow from the defined fluid stream, each flow tube having ends which are fixedly mounted and positioned closely adjacent one another, each flow tube forming a center of gravity juxtaposed to the flow tube mounting position, each flow tube deflecting the fluid in a single direction throughout its length, each said flow tube forming a horizontally positioned "B" shape with the vertex of the "B" shape forming the inlet and the outlet for directing flow into and out of the flow tube and wherein the extension of each side of the "B" shape from the center of gravity is at a greater distance than from the center of gravity to the portion of the "B" shape substantially adjacent to the vertex of the "B" shape, means to oscillate the flow tubes at a position on the portion substantially adjacent the vertex of the "B" shape, the oscillating means vibrating each of the flow tubes in an opposite mode with respect to one another at a resonant frequency higher than its fundamental natural resonant frequency.

7. An apparatus for measuring mass flow of a fluid within a defined fluid stream comprising: a conduit having an inlet manifold and an outlet manifold communicating with the defined fluid stream and receiving the flow from and returning the flow to the stream; the inlet and the outlet rigidly fixed at opposite ends to a housing defining a first channel having a flow splitter for dividing the flow from the inlet into equal portions, the housing further defining a second channel having a flow convergence for directing the equivalent flows into a single stream at the outlet; two substantially identical flow tubes positioned parallel and adjacent one another and connected at opposite ends to the housing, the ends of the flow tubes communicating with the first and second channels of the housing with each tube receiving substantially equivalent flow, each flow tube generally forming a horizontally positioned "B" shape with the vertex of the "B" communicating with the first and second channels respectively, the flow tubes symmetrically forming a first loop connected at one end to the first channel, a connecting portion extending from the first loop adjacent the housing and a second loop connecting the connecting portion with the second channel, each loop of each flow tube substantially forming an arc of approximately 270°, the flow tubes generally forming a center of gravity juxtaposed to the mounted ends and within the area defined by the "B" shape, the connecting portion of each flow tube displaced from the center of gravity by a distance which is less than the extended distance of each loop from the center of gravity; means for vibrating each flow tube transverse to the flow within the tube at the connecting portion, the vibration means positioned substantially at the middle of the length of each flow tube; means for generating signals representative of the motion of the flow tube having two mounting arms, each arm extending from the housing to a position substantially between the flow tubes and adjacent each of the loops of the flow tubes; and means for determining the mass flow by determining the portion of the signals which are a component of the Coriolis reaction of the flow to the applied oscillation.

8. An apparatus as claimed in claim 7 wherein the vibration means selectively oscillates the flow tube at a plurality of discrete resonant vibrational frequencies thereof.

9. An apparatus as claimed in claim 7 wherein the vibration means oscillates the flow tubes at a second harmonic resonant frequency.

10. An apparatus as claimed in claim 7 wherein the vibration means creates a vibrating wave pattern along the length of each of the continuous flow tubes.

11. An apparatus as claimed in claim 7 wherein the vibration means creates nodal points within the length of the flow tube, the nodal points defining local minimum amplitudes of vibration.

12. An apparatus as claimed in claim 7 wherein the vibration means oscillates the flow tube substantially about its center of gravity.

13. An apparatus as claimed in claim 7 wherein the communication of each flow tube to the first and second channels of the housing are positioned closely adjacent with respect to one another and juxtaposed to the center of gravity of the flow tubes.

14. An apparatus as claimed in claim 7 wherein each flow tube is formed in a substantially single plane.

15. An apparatus as claimed in claim 14 wherein the plane of each flow tube is positioned substantially transverse to a line formed by the inlet and the outlet of the conduit.

16. An apparatus as claimed in claim 7 wherein the first and second channels define a gradual turning of the flow with respect to the corresponding inlet and outlet manifold.

17. An apparatus as claimed in claim 7 wherein each "B" shaped flow tube is formed in a plane which is substantially transverse to an axis line formed by the inlet and the outlet and positioned at an angle less than 90° with respect to said line.

18. A Coriolis mass flow meter comprising: a pair of identical flexible and substantially continuous flow tubes each having an inlet and an outlet for receiving and exhausting flow, respectively, the inlet and outlet being fixedly mounted adjacent one another, and means for vibrating the flow tubes at a resonant frequency higher than the fundamental resonance of the flow tube to induce a pattern of vibration having at least one local minimum amplitude therein, wherein the reaction of the fluid in response to the pattern of vibration of the flow tube varies along the length of the flow tube and combines with the vibration pattern to deflect the flow tube, and wherein each of the pair of flow tubes forms a first loop and an arc of substantially 270°, a straight section extending from said first loop, and a second loop substantially identical to the first loop extending from the straight section to the relative outlet of the flow tube, the straight tube section joining at opposite ends with the first and second loops, respectively, approximately at a local amplitude minimum of vibration within the vibration pattern.

19. A Coriolis mass flow meter comprising: a pair of identical flexible and substantially continuous flow tubes each having an inlet and an outlet for receiving and exhausting flow, respectively, the inlet and outlet being fixedly mounted adjacent one another, and wherein each of the pair of flow tubes forms a first loop and an arc of substantially 270°, straight section extending from said first loop and a second loop substantially identical to the first loop extending from the straight section to the outlet of the flow tube, and means for vibrating the flow tubes at a resonant frequency higher than the fundamental resonance of tubes to induce a pattern of vibration having at least one local minimum amplitude therein, wherein the reaction of the fluid in response to the pattern of vibration of the flow tube varies along the length of the flow tube and combines with the vibration pattern to deflect the flow tube, the vibrating means further comprising an electromagnetic driver positioned between the pair of flexible tubes at substantially the center of the straight section of each of the flow tubes, the driver being substantially free floating with respect to the flow tubes, a tab with a permanent magnet fixed thereto being attached to each of the flow tubes and projecting into air gaps within the electromagnetic driver, the electromagnetic driver causing the vibration of the flow tubes by exposing the tabs and the magnets to an alternating electromagnetic force.

20. In a Coriolis mass flow meter as claimed in claim 19 further comprising means for sensing the movement of the pair of flow tubes which produce a signal which is linearly proportional to the displacement of the flow tubes during said vibration.

21. In a Coriolis mass flow meter as claimed in claim 20 wherein the sensing means comprises a magnet and a coil each attached to an opposite flow tube on adjacent positions on each of the loops of the flow tubes.

22. A Coriolis mass flow meter as claimed in claim 20 wherein the sensing means is positioned between the local minimums of amplitude vibration and the fixed ends of each flow tube.

23. A Coriolis mass flow meter as claimed in claim 19 wherein the straight section is positioned spaced from but closely adjacent the center of gravity of the formed flow tube.

24. In a Coriolis mass flow meter having a flow tube oscillated transverse to the direction of the flow therein, sensors mounted on or adjacent the flow tube located symmetrically along the flow tube, the sensors generating signals representative of the motion of the flow tube, and means for determining the mass flow through the flow tube from said signals, comprising: two substantially identical continuous flexible flow tubes positioned parallel and adjacent one another, each said flow tube receiving substantially equivalent flow and having fixedly mounted ends for receiving and exhausting flow, the ends of each flow tube positioned substantially adjacent one another, each of the flow tubes having a center of gravity juxtaposed to its fixed mounting; and means for oscillating the flow tubes at a frequency higher than their fundamental natural resonant frequency so as to create at least one local minimum amplitude of vibration within each flow tube, the oscillating means comprising (a) circuit means for processing the signal generated by one of the sensors and generating therefrom a second signal whose amplitude is representative of the displacement of the flow tube and whose frequency is representative of the frequency of the oscillation of the flow tube, (b) first circuit means responsive to the second signal for detecting when the amplitude of the second signal departs from a pre-selected value and generating an amplitude correction signal for returning the amplitude of the second signal to the pre-selected value, (c) second circuit means responsive to the second signal for generating a frequency control signal representative of the pre-selected frequency of oscillation and the flow tube, (d) circuit means responsive to the amplitude correction signal and the frequency control signal for generating an output signal representative of the constant amplitude and pre-selected frequency, and (e) electromechanical transducer means responsive to the output signal for driving the flow tube.

25. In a Coriolis-type mass flow meter according to claim 24, wherein the sensor means comprises an inductor for sensing velocity of the flow tube and the circuit means for processing the sensor signal comprises an integrator.

26. In a Coriolis-type mass flow meter according to claim 24, wherein the first circuit means responsive to the second signal includes detector means for detecting negative peaks of the second signal and means responsive to the detector means for generating the amplitude correction signal.

27. In a Coriolis-type mass flow meter according to claim 26, wherein the amplitude correction signal is a current signal.

28. In a Coriolis-type mass flow meter according to claim 24, wherein the second circuit means responsive to the second signal includes a phase-locked loop.

29. In a Coriolis-type mass flow meter according to claim 24, wherein the circuit means responsive to the amplitude correction signal and the frequency control signal comprises amplifier means for amplifying the amplitude correction signal and switching means responsive to the frequency control signal for switching the amplified amplitude correction signal to the electromechanical transducer means.

30. In a Coriolis-type mass flow meter according to claim 29, further comprising power amplifier means in series between the amplifier and switching means and the electromechanical transducer means.

31. In a Coriolis mass flow meter comprising: a continuous, flexible flow tube, a manifold for communicating with a defined fluid stream, the manifold having an inlet and outlet, the flow tube communicating with and fixedly mounted at respective ends to the inlet and the outlet, the flow tube ends being fixedly mounted at a position closely adjacent one another and forming a center of gravity juxtaposed to the flow tube mounting position, the flow tube deflecting the fluid in a single direction throughout its length, oscillating means for vibrating the flow tube transverse to the direction of flow therein so as to produce a vibrating wave pattern that varies along the length of the flow tube having two local minimum amplitudes of vibration between the fixed ends, sensors mounted on or adjacent the flow tube, the sensors generating signals representative of the motion of the flow tube, means for determining the mass flow through the flow tube from the sensor signals, and feedback circuit means for controlling the frequency of the oscillating means in response to the sensor signals.

32. In a Coriolis mass flow meter comprising: a continuous flow tube fixedly mounted at opposite ends, oscillating means for vibrating the flow tube transverse to the direction of flow therein so as to produce a vibrating wave pattern that varies along the length of the flow tube having two local minimum amplitudes of vibration between the fixed ends, sensors mounted on or adjacent the flow tube, the sensors generating signals representative of the motion of the flow tube means for determining the mass flow through the flow tube from the sensor signals and feedback circuit means for controlling the frequency of the oscillating means in response to the sensor signals, the feedback circuit means further comprising (a) circuit means for processing the signal generated by the sensors and generating a second signal whose amplitude is representative of the displacement of the flow tube; (b) first circuit means responsive to the second signal for determining when the amplitude of the second signal departs from a preselected value and generating an amplitude correction signal for returning the amplitude of the second signal to the pre-selected value; (c) second circuit means responsive to the second signal for generating a frequency control signal representative of a preselected frequency of oscillation and the flow tube; (d) circuit means responsive to the amplitude correction signal and the frequency control signal for generating an output signal representative of the amplitude and preselected frequency; and (e) electro-mechanical transducer means responsive to the output signal for driving the flow tube.

33. A Coriolis mass flow meter comprising: a conduit having an inlet manifold and an outlet manifold, the inlet manifold and the outlet manifold fixedly attached to one another and adapted to communicate with a defined fluid stream; at least one continuous flow tube having two fixedly mounted ends communicating with the inlet manifold and the outlet manifold, respectively, the flow tube having two deflection arm portions and a crossing portion, the deflection arm portions directing the flow to provide a directional component substantially perpendicular to the direction of the flow through the crossing portion; means to oscillate the flow tube transverse to the direction of flow therein, said oscillating means attached to the flow tube substantially at the center of the crossing portion, said oscillating means vibrating the flow tube at a resonant frequency thereof higher than the fundamental resonance so as to produce a vibrational wave pattern along its length between the ends of the flow tube, the wave pattern having a local minimum amplitude of transverse oscillation and producing a maximum change in angular velocity of the flow within the flow tube that is coincident with the local minimum oscillation amplitudes; sensor means positioned on the flow tube producing a signal proportional to the translation of the flow tube; and means for determining the mass flow rate of the flow through the flow tube from the sensor signals.

34. An apparatus for measuring the mass flow rate of a fluid within a defined fluid stream comprising: a continuous, flexible flow tube having a fixedly mounted input end and outlet end for receiving an exhausting fluid flow, a manifold having an inlet and outlet for communicating with the defined fluid stream, the flow tube fixedly mounted to the manifold with the ends positioned closely adjacent one another, the flow tube forming a center of gravity juxtaposed to the flow tube mounting position and deflecting the fluid within the flow tube in a single direction throughout its length, oscillation means for vibrating the flow tube substantially perpendicular to the flow therein at a resonant frequency of the flow tube higher than the fundamental resonant frequency to induce a vibrating wave pattern that varies along the length of the flow tube having two local maximum amplitudes of vibration moving in the same direction transverse to the direction of flow and at least two local maximum amplitudes of rotation of the flow therein, sensor means located on or adjacent the flow tube for generating signals representative of the motion of the flow tube, and means for determining mass flow rate through the flow tube from said signals.

35. An apparatus as claimed in claim 34 wherein the oscillation means vibrates the flow tube at the third resonant vibrational frequency of the flow tube.

* * * * *